(12) United States Patent
Vrame

(10) Patent No.: US 6,462,278 B1
(45) Date of Patent: Oct. 8, 2002

(54) PROTECTIVE COVER HAVING CURVED EDGES, FOR USE WITH ELECTRICAL BOX HAVING PLASTER RING

(75) Inventor: Peter A. Vrame, Barrington Hills, IL (US)

(73) Assignee: S-P Products, Inc., Elk Grove Village, IL (US)

( * ) Notice: Subject to any disclaimer, the term of this patent is extended or adjusted under 35 U.S.C. 154(b) by 0 days.

(21) Appl. No.: 09/948,344

(22) Filed: Sep. 6, 2001

Related U.S. Application Data

(63) Continuation-in-part of application No. 09/934,200, filed on Aug. 21, 2001.

(51) Int. Cl.[7] .............................................. H02G 3/14
(52) U.S. Cl. ........................... 174/67; 174/66; 220/241; 220/242
(58) Field of Search .............................. 174/58, 66, 67, 174/48, 50, 53; 220/241, 242, 3.8, 4.02, 3.2, 3.3; 33/528; 439/535

(56) References Cited

U.S. PATENT DOCUMENTS

| | | | | |
|---|---|---|---|---|
| 6,028,268 A | * | 2/2000 | Stark et al. | 220/242 X |
| 6,166,329 A | * | 12/2000 | Oliver et al. | 174/58 |
| 6,184,468 B1 | * | 2/2001 | Speziale | 174/66 |
| 6,188,022 B1 | * | 2/2001 | He | 174/58 |
| 6,198,046 B1 | * | 3/2001 | Moodie | 174/67 |
| 6,323,424 B1 | * | 11/2001 | He | 174/58 |
| 6,378,173 B1 | * | 4/2002 | Ho et al. | 220/241 X |

* cited by examiner

Primary Examiner—Dean A. Reichard
Assistant Examiner—Dhiru R. Patel
(74) Attorney, Agent, or Firm—Wood, Phillips, Katz, Clark & Mortimer

(57) ABSTRACT

For an electrical box mounting an electrical device, and having a plaster ring, has a projecting portion defining an aperture providing access to the electrical device, a protective cover is mountable removably to the plaster ring so as to cover the aperture, whereby to protect the electrical device while an aperture accommodating the projecting portion of the plaster ring is cut into the wall panel or while the wall panel is being decorated. In one contemplated embodiment, the protective cover is made from steel and has a window, which has a transparent sight made from a transparent, polymeric material. In another contemplated embodiment, the protective cover in its entirety is made from such a transparent, polymeric material.

7 Claims, 1 Drawing Sheet

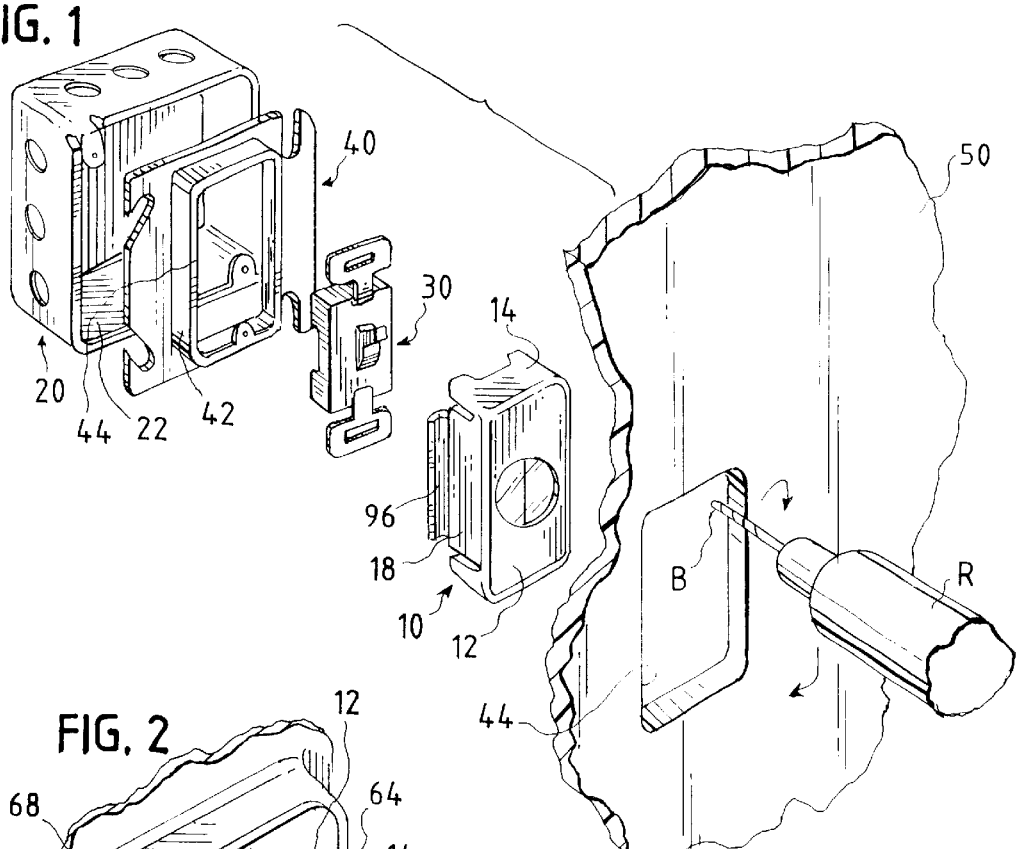
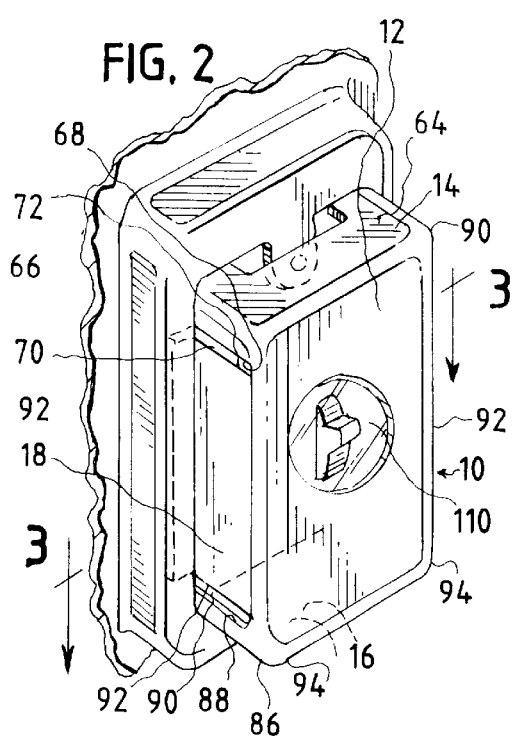
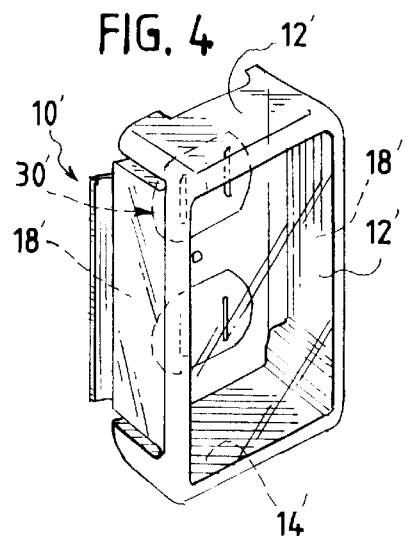
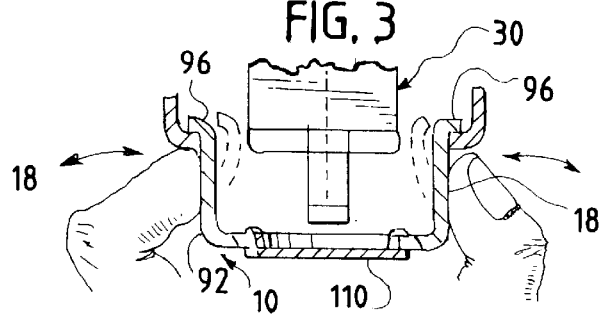

PROTECTIVE COVER HAVING CURVED EDGES, FOR USE WITH ELECTRICAL BOX HAVING PLASTER RING

CROSS-REFERENCE TO RELATED APPLICATION

This application is a continuation-in-part of a patent application filed by Paul A. Vrame and Peter A. Vrame on Aug. 21, 2001, for PROTECTIVE COVER ENABLING VIEW OF ELECTRICAL DEVICE IN ELECTRICAL BOX HAVING PLASTER RING, to which application Ser. No. 09/934,200 has been assigned and the disclosure of which application is incorporated herein by reference.

FIELD OF THE INVENTION

This invention pertains to a protective cover for an electrical box having an open front, mounting an electrical device, such as an electrical switch or an electrical outlet, and having a plaster ring having a generally rectangular aperture. As improved by this invention, the top and bottom flanges of the protective cover are curved at their lateral portions, whereby to eliminate sharp edges that tend to impede proper use of a router or a saw blade to cut an accommodating aperture in a wall panel.

BACKGROUND OF THE INVENTION

As exemplified in U.S. Pat. No. 5,012,043 and in U.S. Pat. No. 6,166,329, it has been known heretofore to employ a protective cover, which is made of steel, for an electrical box having an open front, mounting an electrical device, such as an electrical switch or an electrical outlet, and having a plaster ring, which fastens to the electrical box, around the open front of the electrical box, and which has a projecting portion defining a generally rectangular aperture providing access to the electrical device, through the open front of the electrical box, after the electrical box, the electrical device, and the plaster ring have been installed behind a wall panel, such as a drywall panel.

As known heretofore, the protective cover is mountable removably to the plaster ring so as substantially to cover the generally rectangular aperture of the plaster ring, whereby to protect the electrical device against foreign matter, such as dust and debris, and against damage, such as damage from a router bit or from a saw blade, while an aperture accommnodating the projecting portion of the plaster ring is cut into the wall panel, or against foreign matter, such as paint, wallpaper adhesive, or drywall-finishing material, i.e., so-called "mud", while the wall panel is being decorated near the aperture accommodating the projecting portion of the plaster ring. If the protective cover were not utilized and if the router or the saw blade were to slip, the electrical device could be badly damaged.

At least as early as 1997, a protective cover was available commercially from Ideal Products, Inc. of Wichita, Kan., which cover had lateral formations adapted to coact with lateral edges of the generally rectangular aperture of the projecting portion of a plaster ring, whereby to mount the cover removably to the plaster ring so as substantially to cover the generally rectangular aperture of the plaster ring.

Although the protective covers known heretofore may function well to protect an electrical device against foreign matter, damage, or both, as discussed above, the protective covers known heretofore have sharp edges that tend to impede proper use of a router or a saw blade to cut an accommodating aperture in a wall panel. Installers using those edges to guide a router or a saw blade find it difficult to turn the router or the saw blade abruptly at comers where those edges meet.

SUMMARY OF THE INVENTION

This invention improves a protective cover having a front panel, a top flange, a bottom flange, and two lateral flanges, for use with an electrical box having a plaster ring, as explained above. This invention eliminates eliminate sharp edges that tend to impede proper use of a router or a saw blade to cut an accommodating aperture in a wall panel.

The top flange has a flat, central portion and two lateral portions, each lateral portion curving downwardly to a lower edge, which is spaced by a slit from an upper edge of one of the lateral flanges. The bottom flange has a flat, central portion and two lateral portions, each lateral portion curving upwardly to an upper edge, which is spaced by a slit from a lower edge of one of the lateral flanges. The slits permit the lateral flanges to flex.

Preferably, the front panel meets each of the lateral flanges at a curved edge, which meets each of the lateral portions of the top and bottom flanges at a rounded corner. Preferably, the curved edges and the lateral portions of the top and bottom flanges are curved similarly. Preferably, each of the curved edges and each of the lateral portions of the top and bottom flanges are curved so as to have an exterior radius of approximately 0.25 inch.

Because the slits permit the lateral flanges to flex, the lateral flanges can have respective formations similar to lateral formations of the aforementioned cover that was available commercially from Ideal Products, Inc. of Wichita, Kan., and adapted to coact with lateral edges of the generally rectangular aperture of the projecting portion of a plaster ring, whereby to mount the cover removably to the plaster ring so as substantially to cover the generally rectangular aperture of the plaster ring.

In one contemplated embodiment of this invention, the protective cover has a unitary shell, which is made from steel, which comprises at least marginal portions of the front panel, and which comprises the top, bottom, and lateral flanges. The front panel of the steel shell can have one or more windows, each having a transparent sight made from a transparent, polymeric material, as disclosed in the aforementioned application, the disclosure of which is incorporated herein by reference.

In an alternative embodiment of this invention, the protective cover in its entirety is made from a transparent, polymeric material, as disclosed in the aforementioned application, the disclosure of which is incorporated herein by reference.

BRIEF DESCRIPTION OF THE DRAWINGS

FIG. 1 is a fragmentary, perspective, exploded view of a protective cover of one contemplated construction embodying this invention, as utilized with an electrical box mounting an electrical switch and having a plaster ring having a projecting portion, so as to protect the electrical device against foreign matter, damage, or both while an aperture accommodating the projecting portion of the plaster ring is cut into a wall panel, via a router.

FIG. 2, on a larger scale compared to FIG. 1, is a fragmentary, perspective, assembled view of the protective cover and other elements, as shown in FIG. 1, the electrical switch being shown fragmentarily.

FIG. 3, on a similar scale, is a fragmentary cross-section taken along line 3—3 in FIG. 2, in a direction indicated by arrows and showing how the lateral flanges of the protective cover can flex.

FIG. 4, on a similar scale, is a perspective view of a protective cover of an alternative construction embodying this invention, an electrical outlet being shown fragmentarily.

DETAILED DESCRIPTION OF THE IllUSTRATED EMBODIMENTS

As shown in FIGS. 1, 2, and 3, a protective cover 10 stamped from a sheet of galvanized or stainless steel so as to be box-like and so as to have a front panel 12, a top flange 14, a bottom flange 16, and two lateral flanges 18 is provided for an electrical box 20 made of galvanized or stainless steel, having an open front 22, mounting an electrical switch 30, and having a plaster ring 40, which is made of galvanized or stainless steel, which fastens to the electrical box 20 via fasteners (not shown) in a known manner, around the open front 22 of the electrical box 20, and which has a projecting portion 42 defining a generally rectangular aperture 44 providing access to the electrical switch 30, through the open front 22 of the electrical box 20, after the electrical box 20, the electrical switch 30, and the plaster ring 40 have been installed behind a wall panel 50, such as a drywall panel.

As shown in FIGS. 1 and 2, it is common to utilize a router R having a rotary bit B to cut an aperture 52 accommodating the projecting portion 42 of the plaster ring 40 into the wall panel 50 after the electrical box 20, the electrical switch 30, and the plaster ring 40 have been installed behind the wall panel 50. The protective cover 10 is utilized to protect the electrical switch 30 against foreign matter, such as dust and debris, and against damage, as such as damage from a router bit, while the aperture 52 is cut into the wall panel 50. The protective cover 10 can be then utilized to protect the electrical switch 30 against foreign matter, such as paint, wallpaper adhesive, or drywall-finishing material, while the wall panel 50 is being decorated near the aperture 52. After the wall panel 50 has been decorated near the aperture 52, the protective cover 10 can be then removed so as to permit a decorative plate (not shown) to be then installed in a known manner.

The top flange 14 has a flat, central portion 64 and two lateral portions 66, one said portion 66 being shown and the other portion being a mirror image of the said portion 66 that is shown. Each lateral portion 66 curves downwardly to a lower edge 68, which is spaced by a slit 70 from an upper edge 72 of one of the lateral flanges 18. The bottom flange has a flat, central portion 84 and two lateral portions 86, one said portion 86 being shown and the other portion 86 being a mirror image of the said portion 86 that is shown. Each lateral portion 84 curves upwardly to an upper edge 88, which is spaced by a slit 90 from a lower edge 92 of one of the lateral flanges 18. The slits 70, 90, permit the lateral flanges 18 to flex, as shown in FIG. 3.

Preferably, the front panel 12 meets each of the lateral flanges 18 at a curved edge 94, which meets each of the lateral portions 66, 86, of the top and bottom flanges 14, 16, at a rounded corner 96. Preferably, the curved edges 94 and the lateral portions 66, 86, of the top and bottom flanges 14, 16, are curved similarly. Preferably, each of the curved edges 94 and each of the lateral portions 66, 86, of the top and bottom flanges 14, 16, are curved so as to have an exterior radius of approximately 0.25 inch.

Because the slits 70, 90, permit the lateral flanges 18 to flex, each of the lateral flanges 18 can have a vertically elongate tab 96, which is adapted to coact with a lateral margin 46 of the generally rectangular aperture 44 of the projecting portion 42 of the plaster ring 40, when the lateral flanges 18 are flexed inwardly, so as to mount the protective cover 10 removably to the projecting portion 42 of the plaster ring 40 in a manner known from the protective cover that was available commercially from Ideal Products, Inc. of Wichita, Kan., as discussed above.

As shown in FIGS. 1, 2, and 3, the protective cover 10 has a unitary shell, which is made from steel, which comprises marginal portions of the front panel 12, and which comprises the top flange 14, the bottom flange 16, and the lateral flanges 18. The front panel 12 has a circular window 100, which has a transparent sight 110 made from a transparent, polymeric material, such as polycarbonate, as disclosed in the aforementioned application, the disclosure of which is incorporated herein by reference.

As shown in FIG. 4, a protective cover 10' having a front panel 12', a top flange 14', a bottom flange 16', and two lateral flanges 18' is similar to the protective cover 10 and is utilized similarly, except that the protective cover 10' in its entirety is made from a transparent, polymeric material, such as polycarbonate, as by injection molding or by thermo-forming. FIG. 4 shows, fragmentarily, an electrical outlet 30', rather than the electric switch 30.

What is claimed is:

1. For an electrical box having an open front, mounting an electrical device, and having a plaster ring, which fastens to the electrical box, around the open front of the electrical box, and which has a projecting portion defining a generally rectangular aperture providing access to the electrical device, through the open front of the electrical box, after the electrical box, the electrical device, and the plaster ring have been installed behind a flange panel, a protective cover mountable removably to the plaster ring so as at least substantially to cover the generally rectangular aperture of the plaster ring, whereby to protect the electrical device against foreign matter, damage, or both while an aperture accommodating the projecting portion of the plaster ring is cut into the flange panel or while the flange panel is being decorated near the aperture accommodating the projecting portion of the plaster ring, the protective cover having a front panel, a top flange, a bottom flange, and two lateral flanges, wherein the top flange has a flat, central portion and two first lateral portions, each first lateral portion curving downwardly to a lower edge, which is spaced by a slit from an upper edge of one of the lateral flanges, and the bottom flange has a flat, central portion and two second lateral portions, each second lateral portion curving upwardly to an upper edge, which is spaced by a slit from a lower edge of one of the lateral flanges, the slits permitting the lateral flanges to flex.

2. The protective cover of claim 1 wherein the front panel meets each of the lateral flanges at a curved edge, which meets each of the lateral first and second portions of the top and bottom flanges at a rounded corner.

3. The protective cover of claim 2 wherein the curved edges and the first and second lateral portions of the top and bottom flanges are curved similarly.

4. The protective cover of claim 1 wherein each of the first and second lateral portions of the top and bottom flanges is curved so as to have an exterior radius of approximately 0.25 inch.

5. The protective cover of claim 2 wherein each of the curved edges and each of the first and second lateral portions of the top and bottom flanges are curved so as to have an exterior radius of approximately 0.25 inch.

6. The protective cover of any one of claims 1 through 5 wherein the protective cover has a unitary shell, which is made from steel, which comprises at least marginal portions of the front panel, and which comprises the top, bottom, and lateral flanges.

7. The protective cover of any one of claims 1 through 5 wherein the protective cover is made from a transparent, polymeric material.

* * * * *